(12) United States Patent
Yo

(10) Patent No.: US 10,906,846 B2
(45) Date of Patent: Feb. 2, 2021

(54) CONTINUOUS HEATING REACTOR FOR COMPOSTING

(71) Applicant: GREEN GLOVE LTD., George Hill (AI)

(72) Inventor: Hong-Shien Yo, Taoyuan (TW)

(73) Assignees: Hong-Shien Yo, Taoyuan (TW); GREEN GLOVE LTD., George Hill (AI)

( * ) Notice: Subject to any disclaimer, the term of this patent is extended or adjusted under 35 U.S.C. 154(b) by 138 days.

(21) Appl. No.: 16/160,895

(22) Filed: Oct. 15, 2018

(65) Prior Publication Data

US 2020/0115295 A1    Apr. 16, 2020

(51) Int. Cl.
 *C05F 17/60* (2020.01)
 *C05F 17/929* (2020.01)
 *C05F 17/964* (2020.01)

(52) U.S. Cl.
 CPC ............ *C05F 17/60* (2020.01); *C05F 17/929* (2020.01); *C05F 17/964* (2020.01)

(58) Field of Classification Search
 CPC ....... C05F 17/60; C05F 17/964; C05F 17/929
 USPC ....................................... 435/290.3
 See application file for complete search history.

(56) References Cited

U.S. PATENT DOCUMENTS

| | | | |
|---|---|---|---|
| 2004/0147013 A1* | 7/2004 | Pratte | C05F 17/929 435/290.3 |
| 2004/0172996 A1* | 9/2004 | Matsui | F26B 17/20 71/8 |
| 2005/0106715 A1* | 5/2005 | Niv | C05F 17/979 435/290.3 |
| 2007/0190643 A1* | 8/2007 | Noll | C12M 23/50 435/290.3 |
| 2015/0191386 A1* | 7/2015 | Mayrand | C05F 17/907 210/297 |

* cited by examiner

*Primary Examiner* — Michael L Hobbs
*Assistant Examiner* — Lenora A Abel

(57) ABSTRACT

A continuous heating reactor for composting includes a rotary reactor including a cylindrical reactor housing and push plates arranged inside the cylindrical reactor housing and spaced along the length and inner diameter thereof, a transmission mechanism adapted for rotating the cylindrical reactor housing at a predetermined speed to cause the push plates to push and stir the feeding waste organic material, and a heater for heating the feeding waste organic material in the cylindrical reactor housing by means of the circulation of a hot oil.

4 Claims, 4 Drawing Sheets

CONTINUOUS HEATING REACTOR FOR COMPOSTING

BACKGROUND OF THE INVENTION

1. Field of the Invention

The present invention relates to composting technology and more particularly, to a continuous heating reactor for composting, which uses a rotary propelling action to move and stir a waste organic material in a cylindrical reactor housing and to deliver the waste organic material out of the cylindrical reactor housing, controlling the time during which the waste organic material is left in the cylindrical reactor housing.

2. Description of the Related Art

Organic solid waste can be recycled through composting. The general composting method requires a long time to accumulate organic matter in a static manner. Related companies add catalytic reactants to organic matter and use a heating reactor to accelerate composting. However, the use of a heating reactor can simply heat a certain amount of organic matter at a time. After completion of a composting reaction, the composted organic matter must be removed from the heating reactor so that a new amount of organic matter can be placed in the heating reactor. This composting method consumes much working hours and labor, leading to increased cost.

SUMMARY OF THE INVENTION

The present invention has been accomplished under the circumstances in view. It is therefore the main object of the present invention to provide a continuous heating reactor for composting, which improves composting efficiency and achieves automation by means of propelling the feeding waste organic material through a rotary motion and evenly heating the feeding waste organic material during the rotary motion.

To achieve this and other objects of the present invention, a continuous heating reactor, comprises a base unit, a transmission mechanism, a heater and a rotary reactor. The base unit comprises a base frame, a feed hopper mounted at a front side of the base frame, and a discharge hopper mounted at an opposing rear side of the base. The rotary reactor comprises a cylindrical reactor housing horizontally and rotatably supported on the base unit, and a plurality of push plates disposed in the cylindrical reactor housing. The cylindrical reactor housing has two opposite ends thereof respectively pivotally connected to and disposed in communication with the feed hopper and the discharge hopper. The transmission mechanism is adapted for rotating the cylindrical reactor housing relative to the base unit so that when a waste organic material is put through the feed hopper into the cylindrical reactor housing, the push plates are rotated with the cylindrical reactor housing to mix the waste organic material and to push the waste organic material toward the discharge hopper for discharge. The heater is adapted for circulating a hot oil through a heating tube in the cylindrical reactor housing to heat the waste organic material being propelled by the push plates.

DETAILED DESCRIPTION OF THE PREFERRED EMBODIMENT

Figure 1:
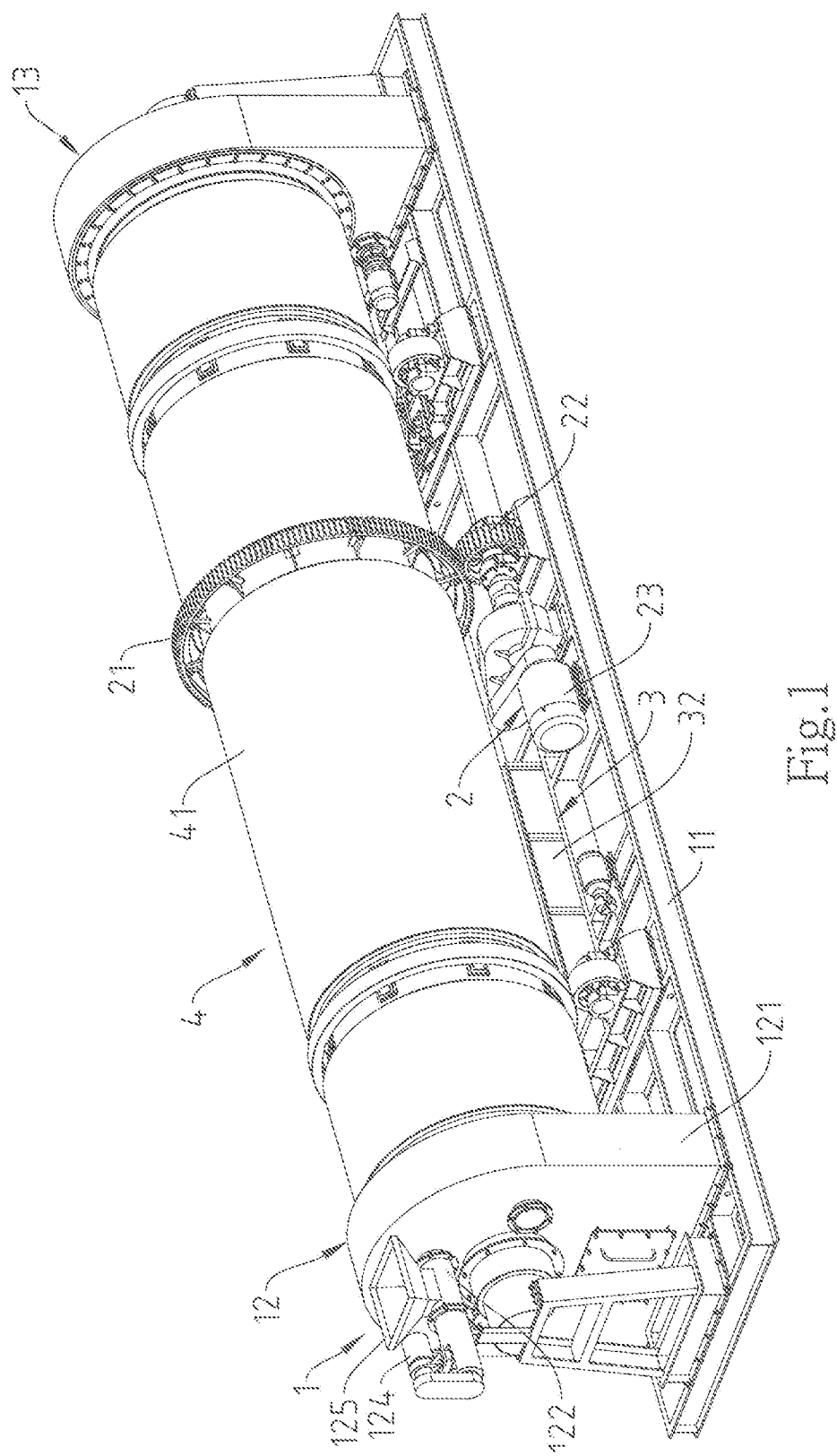
FIG. 1 is an oblique top elevational view of a continuous heating reactor for composting in accordance with the present invention.
Figure 2:
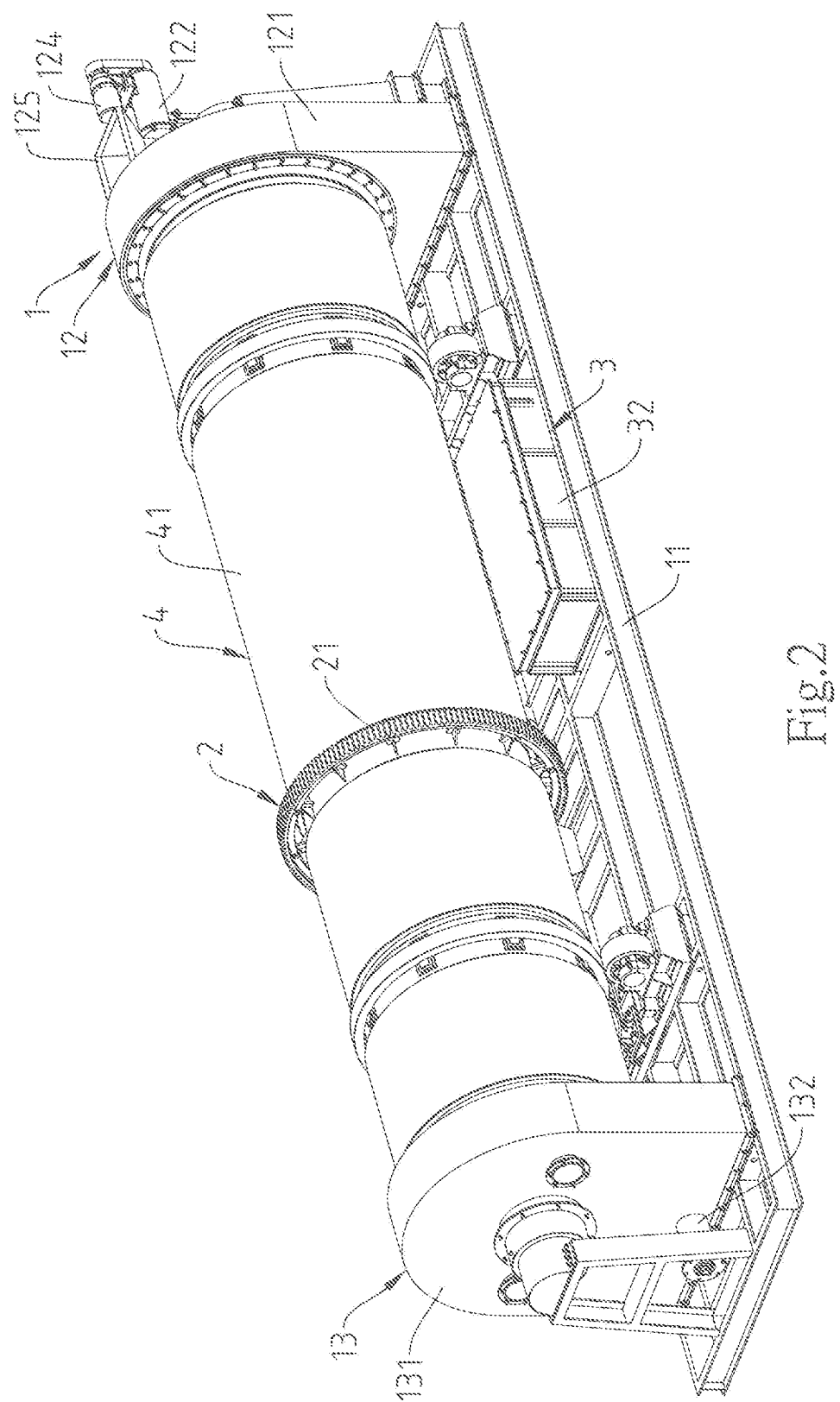
FIG. 2 corresponds to FIG. 1 when viewed from another angle.
Figure 3:
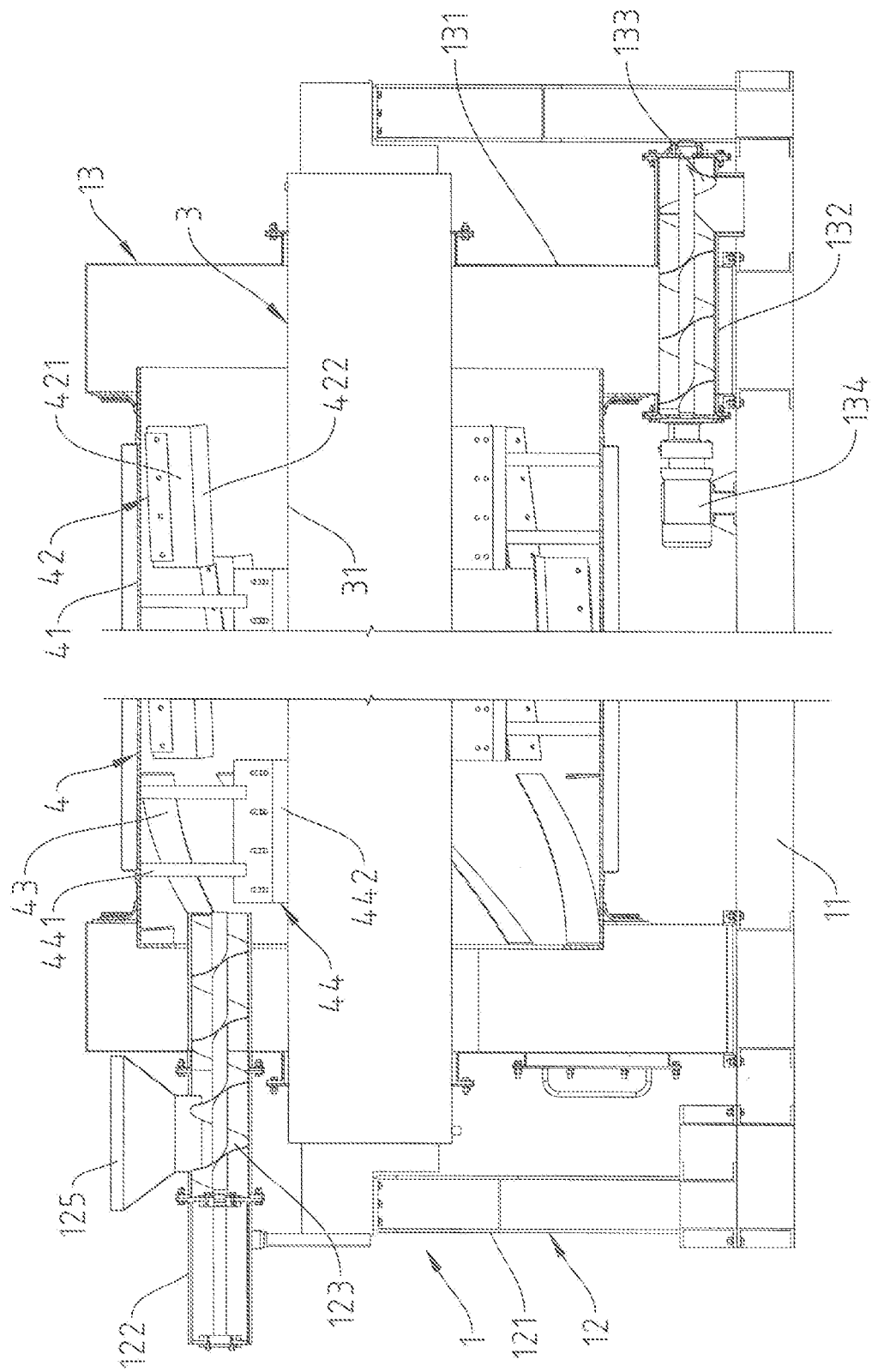
FIG. 3 is a schematic sectional view of the continuous heating reactor for composting in accordance with the present invention.
Figure 4:
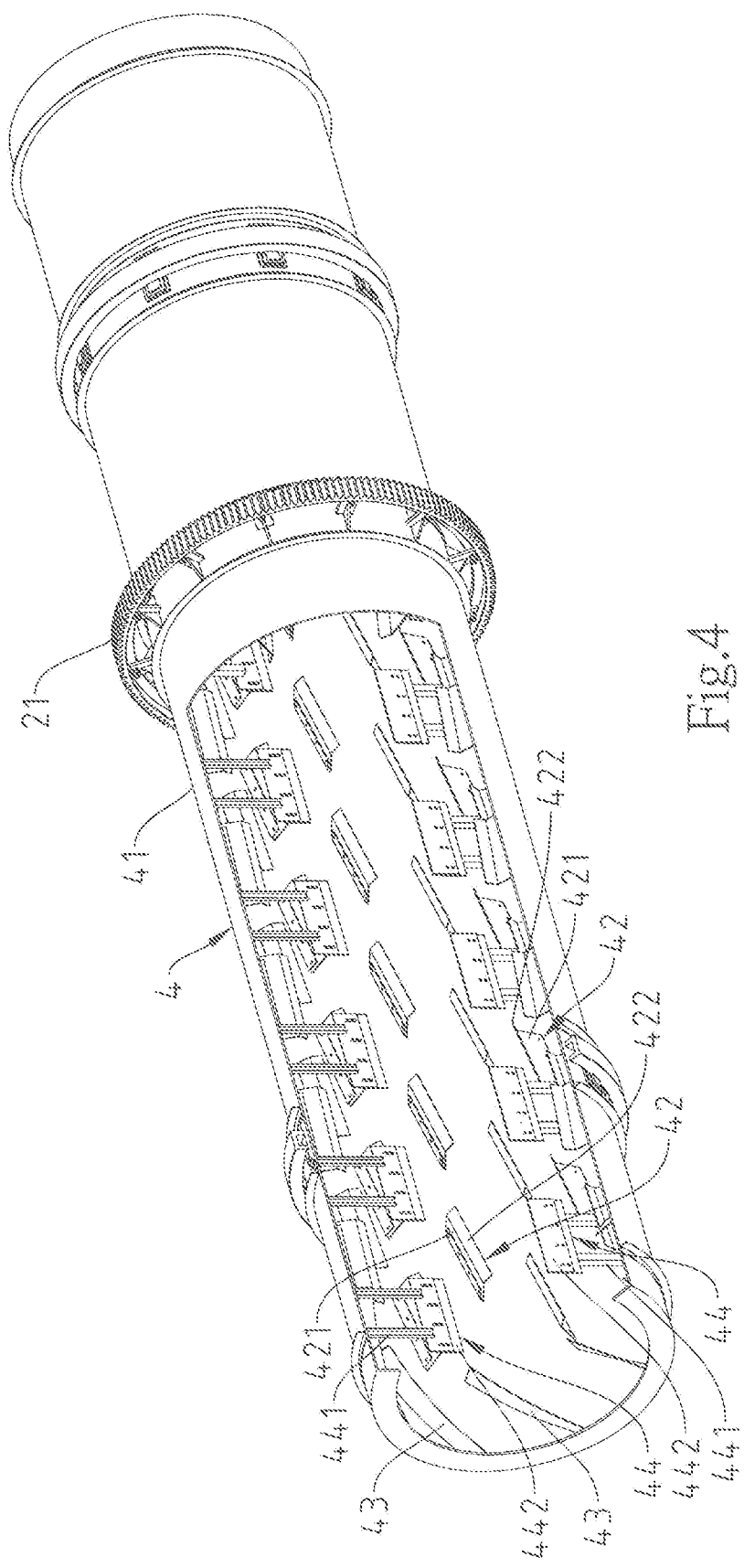
FIG. 4 is a sectional elevation of the cylindrical reactor housing.

Referring to FIGS. 1-4, a continuous heating reactor for composting in accordance with the present invention is shown. The continuous heating reactor for composting comprises a base unit 1, a transmission mechanism 2, a heater 3 and a rotary reactor 4.

The base unit 1 comprises a base frame 11, a feed hopper 12 mounted at a front side of the base frame 11, and a discharge hopper 13 mounted at an opposing rear side of the base frame 11. The feed hopper 12 comprises a feed hopper rack 121, a feed tube 122, a feed propeller 123, a feed motor 124 and a mouthpiece 125. The feed hopper rack 121 is erected on the front side of the base frame 11. The feed tube 122 is inserted through the feed hopper rack 121. The feed propeller 123 is mounted in the feed tube 122 and connected to the feed motor 124. The mouthpiece 125 is connected to the feed tube 122. The discharge hopper 13 comprises a discharge hopper rack 131, a discharge tube 132, a discharge propeller 133 and a discharge motor 134. The discharge hopper rack 131 is erected on the rear side of the base frame 11. The discharge tube 132 is inserted through the discharge hopper rack 131 with one end thereof exposed to the outside of the discharge hopper rack 131. The discharge propeller 133 is mounted in the discharge tube 132 and connected to the discharge motor 134.

The rotary reactor 4 comprises a cylindrical reactor housing 41, and a plurality of push plates 42, propelling plates 43 and scrapers 44 respectively disposed inside the cylindrical reactor housing 41. The cylindrical reactor housing 41 has two opposite ends thereof respectively pivotally connected to the feed hopper rack 121 of the feed hopper 12 and the discharge hopper rack 131 of the discharge hopper 13 so that the cylindrical reactor housing 41 is horizontally and rotatably supported on the base frame 11. Further, the cylindrical reactor housing 41 is disposed in communication with the feed hopper rack 121 and the discharge hopper rack 131. Further, the feed tube 122 has one end thereof extended to the inside of the cylindrical reactor housing 41 of the rotary reactor 4. The push plates 42 are arranged inside the cylindrical reactor housing 41 and spaced along the length and inner diameter of the cylindrical reactor housing 41. Each push plate 42 comprises an oblique push portion 421 and a stirring portion 422. The oblique push portion 421 has one end thereof connected to the inner perimeter of the cylindrical reactor housing 41, and an opposing end thereof connected with the stirring portion 422. The oblique push portion 421 and the stirring portion 422 define therebetween an obtuse angle. The propelling plates 43 are spirally arranged in one end of the cylindrical reactor housing 41 adjacent to the feed hopper 12. The scrapers 44 are arranged in multiple rows inside the cylindrical reactor housing 41 of the rotary reactor 4 along the length thereof, each comprising a scraper frame 441 connected to the inner perimeter of the cylindrical reactor housing 41, and a scraper blade 442 connected to the scraper frame 441.

The transmission mechanism 2 comprises a transmission gear ring 21, a drive gear 22 and a driver 23. The transmission gear ring 21 is fixedly mounted around the outer perimeter of the cylindrical reactor housing 41 of the rotary reactor 4. The drive gear 22 is rotatably mounted on the base frame 11 of the base unit 1 and meshed with the transmission gear ring 21. The driver 23 is mounted on the base frame 11 of the base unit 1 and adapted for rotating the drive gear 22.

The heater 3 comprises a heating tube 31, and a hot fuel tank 32 connected with the heating tube 31. The heating tube 31 is suspended in the cylindrical reactor housing 41 of the rotary reactor 4. The hot fuel tank 32 is used to feed hot oil into the heating tube 31 through a circulation pump and to extract the hot oil in the heating tube 31. The scraper blades 442 of the scrapers 44 are disposed in contact with the outer perimeter of the heating tube 31.

In application, the prepared waste organic material is placed in the mouthpiece 125. Thereafter, the feed motor 124 is activated to rotate the feed propeller 123 at a predetermined speed, propelling the waste organic material into the cylindrical reactor housing 41. At the same time, the driver 23 is activated to rotate the drive gear 22, causing rotation of the transmission gear ring 21 and the cylindrical reactor housing 41. During rotation of the cylindrical reactor housing 41, the feeding waste organic material is mixed and pushed by the propelling plates 43 and the push plates 42 to displace toward the discharge hopper 13 and simultaneously heated by the heating tube 31. The residence time of the waste organic material in the cylindrical reactor housing 41 is controlled by the rotational speed of the cylindrical reactor housing 41. Thus, the well mixed and heated waste organic material is smoothly pushed to the discharge hopper rack 131 into the discharge tube 132 and propelled into the discharge tube 132 by the discharge propeller 133 subject to the operation of the discharge motor 134. During the operation, the scraper blades 442 remove the residues of the waste organic material from the outer surface of the heating tube 31, avoiding accumulation of the waste organic material on the outer surface of the heating tube 31.

What is claimed is:

1. A continuous heating reactor, comprising a base unit, a transmission mechanism, a heater and a rotary reactor, wherein:
    said base unit comprises a base frame, a feed hopper mounted at a front side of said base frame, and a discharge hopper mounted at an opposing rear side of said base frame;
    said rotary reactor comprises a cylindrical reactor housing horizontally and rotatably supported on said base unit, and a plurality of push plates disposed in said cylindrical reactor housing, said cylindrical reactor housing having two opposite ends thereof respectively pivotally connected to and disposed in communication with said feed hopper and said discharge hopper, said push plates configured to urge waste organic material in said rotary reactor towards the discharge hopper;
    said transmission mechanism coupled to said cylindrical reactor housing and configured to rotate the cylindrical reactor housing relative to said base unit so that when the waste organic material is placed in said feed hopper into said cylindrical reactor housing, said push plates are rotated with said cylindrical reactor housing to mix said waste organic material and to push said waste organic material toward said discharge hopper for discharge;
    wherein said push plates are spaced along a length and inner diameter of said cylindrical reactor housing, each said push plate comprising an oblique push portion and a stirring portion, said oblique push portion having one end thereof connected to the inner perimeter of said cylindrical reactor housing and an opposing end thereof connected with said stirring portion, said oblique push portion and said stirring portion defining therebetween an obtuse angle;
    wherein said rotary reactor further comprises a plurality of propelling plates spirally arranged on one end of said cylindrical reactor housing adjacent to said feed hopper;
    wherein said heater comprises a heating tube suspended in and extending longitudinally along the length of a center of said cylindrical reactor housing, and a hot fuel tank connected with said heating tube and adapted for feeding a hot oil into said heating tube through a circulation pump and extracting hot oil in said heating tube; and
    wherein said rotary reactor further comprises a plurality of scrapers arranged in multiple rows inside said cylindrical reactor housing of said rotary reactor along the length thereof, each of said scrapers comprising a scraper frame connected to the inner perimeter of said cylindrical reactor housing and a scraper blade connected to said scraper frame, the scraper blades contacting an outer perimeter of the heating tube.

2. The continuous heating reactor as claimed in claim 1, wherein said transmission mechanism comprises a transmission gear ring fixedly mounted around the outer perimeter of said cylindrical reactor housing of said rotary reactor, a drive gear rotatably mounted on said base frame of said base unit and meshed with said transmission gear ring, and a driver mounted on said base frame of said base unit and adapted for rotating said drive gear.

3. The continuous heating reactor as claimed in claim 1, wherein said feed hopper comprises a feed hopper rack, a feed tube, a feed propeller, a feed motor and a mouthpiece, said feed hopper rack being erected on the front side of said base frame, said feed tube being inserted through said feed hopper rack, said feed propeller being mounted in said feed tube and connected to said feed motor, said mouthpiece being connected to said feed tube.

4. The continuous heating reactor as claimed in claim 1, wherein said discharge hopper comprises a discharge hopper rack, a discharge tube, a discharge propeller and a discharge motor, said discharge hopper rack being erected on said base frame to support said cylindrical reactor housing in a rotatable manner, said discharge tube being inserted through said discharge hopper rack with one end thereof exposed to the outside of said discharge hopper rack, said discharge propeller being disposed in said discharge tube and connected to said discharge motor.

* * * * *